Figure 1:
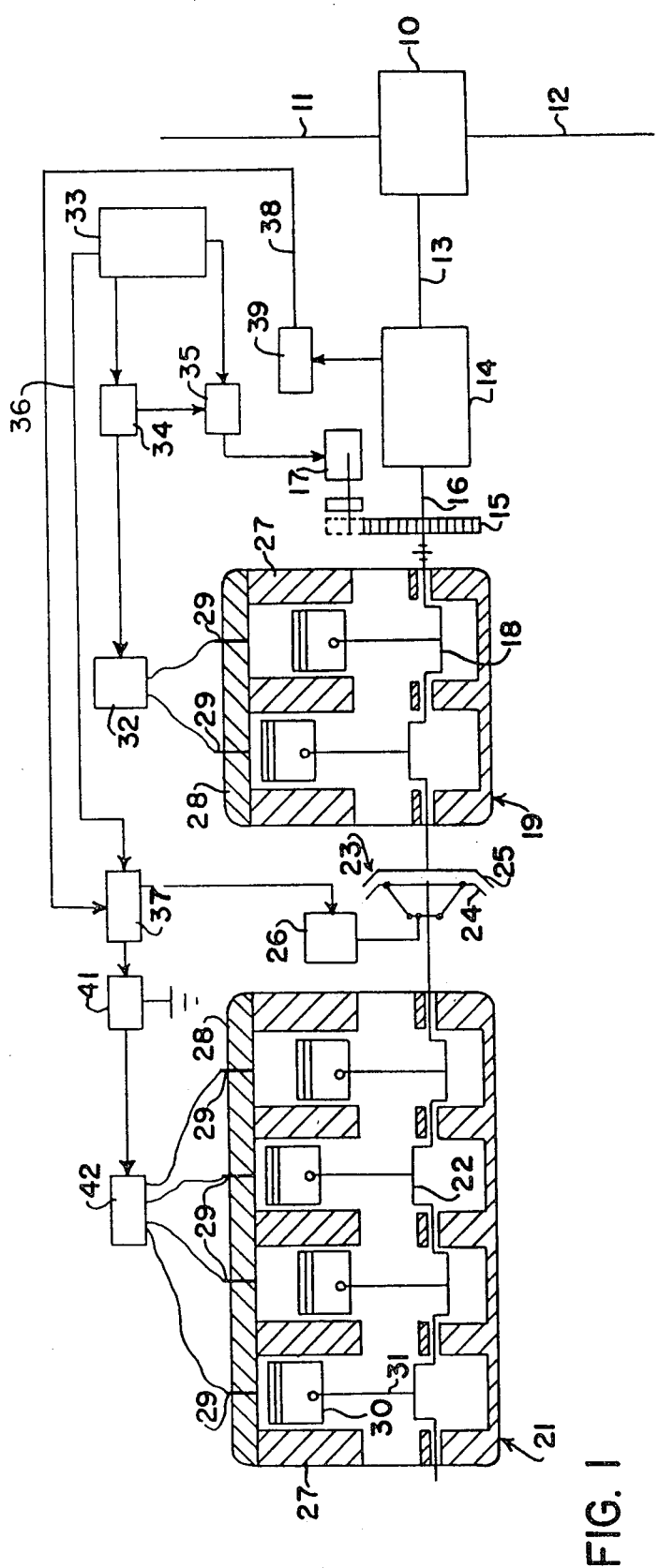

United States Patent [19]

Vagias

[11] 4,421,217

[45] Dec. 20, 1983

[54] PROPULSION SYSTEM FOR A VEHICLE

[76] Inventor: Ernest Vagias, 265 Prospect St., Baden, Pa. 15005

[21] Appl. No.: 223,022

[22] Filed: Jan. 6, 1981

[51] Int. Cl.³ .................. B60K 41/02; F01B 21/02; F16D 25/08
[52] U.S. Cl. .................. 192/0.098; 60/709; 60/718; 180/54 C; 192/0.034; 192/34; 192/85 C
[58] Field of Search ............ 192/0.034, 0.098, 85 C, 192/85 CA, 34; 60/709, 718; 180/54 C, 69.6

[56] References Cited

U.S. PATENT DOCUMENTS

| | | | |
|---|---|---|---|
| 1,080,624 | 12/1913 | Diesel | 60/718 |
| 1,636,050 | 7/1927 | Fottinger | 60/718 |
| 2,267,066 | 12/1941 | Wolf | 180/54 C |
| 2,343,265 | 3/1944 | Price | 180/54 C |
| 2,419,807 | 4/1947 | Wilcox | 180/54 C |
| 2,419,810 | 4/1947 | Beall | 60/709 X |
| 2,419,811 | 4/1947 | Beall | 60/709 X |
| 2,487,937 | 11/1949 | Miskunas | 192/67 R X |
| 3,197,962 | 8/1965 | Suttles | 180/54 C X |
| 3,481,437 | 12/1969 | Araikawa | 192/85 C |
| 3,949,556 | 4/1976 | Wallis | 60/709 |
| 4,027,485 | 6/1977 | Wallis | 60/709 |
| 4,069,803 | 1/1978 | Cataldo | 192/85 A X |

FOREIGN PATENT DOCUMENTS 55-37569  3/1980  Japan .................... 60/709

*Primary Examiner*—Rodney H. Bonck
*Attorney, Agent, or Firm*—Thomas H. Murray; Clifford A. Poff

[57] ABSTRACT

A clutch is arranged to drivingly connect and disconnect the crankshaft members of two internal combustion engines. One engine which is preferably the smaller of the two engines is operated to propel a vehicle by delivering torque through a transmission to a differential and then to the wheels. When to meet the demand for increased power requirements, the clutch is engaged to form a tandem arrangement of engines. Torque is supplied by both engines with the second and larger engine transmitting torque through the crankshaft of the first engine. Clutch members are moved into and out of engagement according to one embodiment and according to a second embodiment, the second and larger engine is moved to force a clutch member into a driving relationship.

5 Claims, 2 Drawing Figures

PROPULSION SYSTEM FOR A VEHICLE

BACKGROUND OF THE INVENTION

This invention relates to a tandem arrangement of internal combustion engines having crankshafts that are selectively coupled together by a clutch such that, when coupled, the torque developed by both engines is delivered to a transmission and thence to other propulsion machinery such as wheels and, when the clutch is disconnected, only one engine operates to deliver torque to the transmission. The tandem arrangement of internal combustion engines is intended to meet the demand for adequate power during acceleration of the vehicle and good fuel economy at highway speeds which can be sustained over a period of time at relatively low power requirements.

The demand for more fuel efficient vehicles has brought about a substantial reduction to the weight of the vehicle and, hence, also in most instances, the size of the vehicle. A smaller internal combustion engine in terms of its physical size and power output can propel such a vehicle with greater fuel economy. However, such a vehicle may not adequately perform under conditions imposing heavy demands for power. Conditions where this occurs include using the vehicle for towing purposes, accelerating particularly in a region of hilly terrain. To meet the need for increased power, it is known to modify the operation of a V-8 internal combustion engine such that at reduced power requirements, the engine operates on only six cylinders or even on only four cylinders. Recent developments on this idea include the use of a device to disable the valves for certain selected cylinders to reduce the number of cylinders that are operative. During the time when less than all of the cylinders of the engine are operative, friction by the moving pistons in the cylinder walls, bearings and the like is seen to have an adverse effect on the efficient operation of the engine. This invention seeks to overcome the foregoing disadvantages and shortcomings of known uses of internal combustion engines for a vehicle.

SUMMARY OF THE INVENTION

It is an object of the present invention to provide a propulsion system for a vehicle wherein a clutch is arranged and controlled to drivingly connect the crankshaft members of two internal combustion engines for operation as a unit to supply torque to a transmission and to drivingly disconnect the crankshaft members so that only one engine is operative and transmits torque to the transmission of the vehicle.

More specifically, according to the present invention, there is provided a propulsion system for a vehicle including the combination of first and second internal combustion engines having an ignition system and a crankshaft, clutch means to drivingly connect and disconnect the crankshaft members of the internal combustion engines, switch means to energize the ignition system of the second internal combustion engine when the clutch is engaged and during the time when at least the ignition system for the first internal combustion engine is operating, and means including a transmission to receive torque from the first internal combustion engine when the clutch means is disengaged and to receive torque from the first and second internal combustion engines when the crankshafts thereof are connected together by the clutch means.

The first and second internal combustion engines preferably have substantially different torque output capacities with the engine having a smaller torque output capacity arranged for continuous use to propel the vehicle while the engine having the larger torque output capacity is arranged to operate only at times when a greater power output is needed. It is preferred to use a clutch having one member movable relative to another member for engagement and disengagement of the crankshafts in a driving relation; however, one engine can be mounted for movement toward and away from the other engine to effect engagement and disengagement of the clutch.

Figure 2:
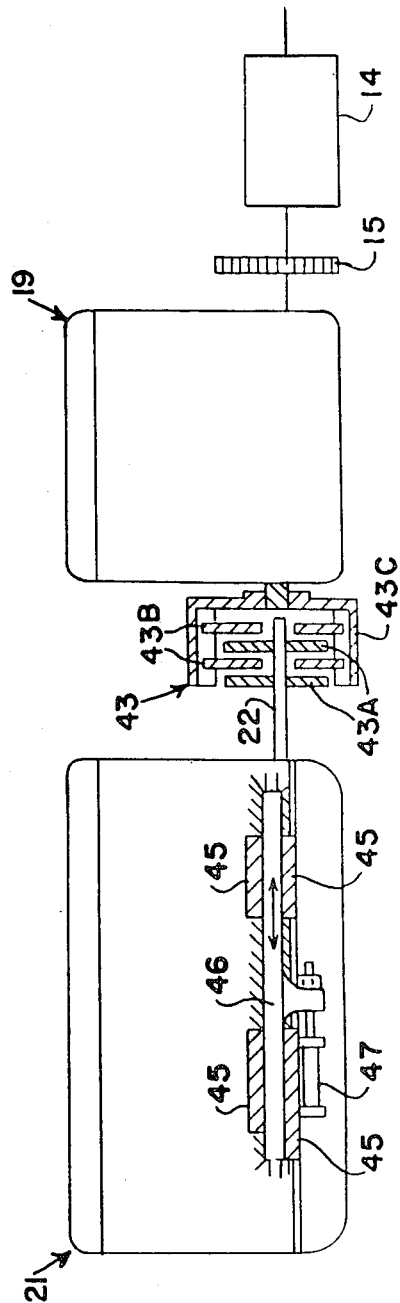

These features and advantages of the present invention as well as others will be more fully understood when the following description is read in light of two embodiments of the invention shown in the drawings, wherein:

FIG. 1 is a schematic illustration of one embodiment of a propulsion system according to the present invention; and FIG. 2 illustrates a second embodiment providing that one of the internal combustion engines is movable relative to the other for engagement and disengagement of the clutch.

In FIG. 1, the power train for a vehicle is shown schematically and includes a differential 10 having oppositely-extending axle members 11 and 12 for delivering torque to wheel members in a manner, per se, well known in the art. The differential assembly 10 is coupled by a shaft 13 which typically takes a well-known form of a drive shaft, to a transmission 14. The transmission can be of any well-known form. A flywheel 15 is mounted on an input shaft 16 to the transmission. An electric starting motor 17 has a pinion that is moved into and out of engagement with the teeth on the outer periphery of the flywheel 15. The input shaft 16 is coupled to one end of a crankshaft 18 of a first internal combustion engine 19. A second internal combustion engine 21 includes a crankshaft 22. A clutch 23 includes a clutch member 24 mounted for sliding movement on the crankshaft 22 and a clutch member 25 mounted on crankshaft 18 in a stationary manner. Clutch member 24 is moved in response to an actuator 26 into a position forming a drive interconnection between crankshafts 18 and 22. The actuator also moves clutch member 24 to disconnect the crankshafts from the driving connection. The internal combustion engines 19 and 21 embody a construction of parts that is, per se, well known in the art. Each engine includes an engine block 27 to which a head 28 is attached. Igniters, such as spark plugs 29, communicate with a combustion space. Valve members control the supply of fuel and discharge of burnt gases of the combustion process to develop a force on pistons 30 each of which is coupled by a connecting rod 31 to the crankshaft of the engine. The igniters 29 for engine 19 are controlled by a distributor system 32 that is coupled to battery 33 through a switch 34. Switch 34 can be positioned to deliver a control current to a solenoid 35 for applying battery current to solenoid 17 for starting the internal combustion engine 19. Battery current is also delivered by a line 36 to a switch 37 that is closed mechanically such as by hand operation or, preferably, in response to a signal delivered by line 38 from a sensor 39. The sensor responds to a torque demand in transmission 14 when the torque demand is above a predetermined level, switch 37 is closed to deliver battery current to actuator 26 and to a switch 41. Switch 41 can be operated independently of switch 37 but essentially it is closed to deliver battery current to a distributor system 42 for igniters 29 of the internal combustion engine 21.

Internal combustion engine 19 is energized and used to propel the vehicle when demands for power are relatively low. To achieve maximum fuel economy during this mode of operation, the internal combustion engine 19 has a small cubic inch displacement, e.g. a two-cylinder configuration. A four-cylinder engine of modern-day construction can be used to form the internal combustion engine 19. Starter 17 is used to start engine 19 in the usual manner. When the power requirement cannot be met by the torque output by engine 19, the clutch 23 is energized by actuation of actuator 26 at a time when current is delivered to distributor system 42. An electric starter motor is not necessary for engine 21 since the torque produced by engine 19 is transmitted through clutch 23 to start engine 21. A control for the supply of fuel is carried out using fuel injection systems for each engine or by movement of the mechanical linkage system coupled to a carburetor for each of the engines. A solenoid or other form of actuator is coupled in the linkage system as will be apparent to those skilled in the art, to immobilize and isolate the linkage system for the engine 21 during periods of time when it is not operating.

FIG. 2 illustrates a movable support arrangement for engine 21 to permit a physical displacement in a direction which is generally parallel to the rotational axis of crankshaft 22. Displacement of the engine in this manner is for the purpose of engaging and disengaging individual plate members of a clutch 43. Clutch 43 includes at least one but preferably a plurality of clutch plates 43A made of steel and at least one but preferably a plurality of clutch plates 43B made of brass or other metal dissimilar to steel. Clutch plates 43A have a central bore with teeth that mesh with teeth formed by a splined surface on the end of crankshaft 22 which projects from engine 21. Clutch plates 43B have teeth like projections on their outer circumferential edges that mesh with internal teeth in a hub member 43C. Member 43C is keyed or otherwise secured to rotate with crankshaft 18 of engine 19. Projecting from each of the opposite lateral sides of the engine block 27 are two pairs of support ribs 45. The support ribs of each pair are spaced apart to form a gap into which a support plate 46 is received. The support plate is attached to frame members of the vehicle. An actuator 47, such as a hydraulic piston and cylinder assembly, is mounted onto one of the ribs 45 such that the rod end thereof extends generally parallel with the plate 46. A bracket 48 projects from the lower surface of plate 46. The bracket is mechanically coupled to the rod end of the piston and cylinder assembly. The actuator 47 is controlled by the switch 37 for operation of the engines 19 and 21 in a manner which has been described above. The members 43A and 43B of clutch 43 are brought into driving relationship by displacement of engine 21 toward engine 19 through a relatively small distance which can be typically a quarter inch or less since it is only necessary to move the clutch plates into an engaging relation from a position where a running clearance exists between the plates.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A propulsion system for a vehicle including the combination of first and second internal combustion engines each having an ignition system and a crankshaft, clutch means to drivingly connect and disconnect the respective crankshafts of said internal combustion engines, said clutch means including a first clutch member mounted onto the crankshaft of said first internal combustion engine and a second clutch member mounted onto the crankshaft of said second internal combustion engine to engage with said first clutch member, switch means to energize the ignition system of said second internal combustion engine when said clutch is engaged and during the time when at least the ignition system for said first internal combustion engine is operating, means including a transmission to deliver torque from said first internal combustion engine when said clutch means is disengaged or from said first and second internal combustion engines when the crankshafts thereof are connected together by said clutch means, means to support said second internal combustion engine for movement toward and away from said first internal combustion engine for engaging and disengaging said clutch means, actuator means to move said second internal combustion engine for engaging said first and second clutch members, and control means responsive to said switch means for energizing said actuator means to engage said first and second clutch members.

2. The propulsion system according to claim 1 wherein said first and second internal combustion engines define substantially different torque output capacities.

3. The propulsion system according to claim 1 wherein said second internal combustion engine defines substantially greater torque output capacity as compared with the torque output capacity of said first internal combustion engine.

4. The propulsion system according to claim 1 wherein said actuator means includes a piston and cylinder assembly.

5. The propulsion system according to claim 1 wherein said clutch means transmits torque from said first internal combustion engine to start said second internal combustion engine.

* * * * *